Patented July 22, 1930

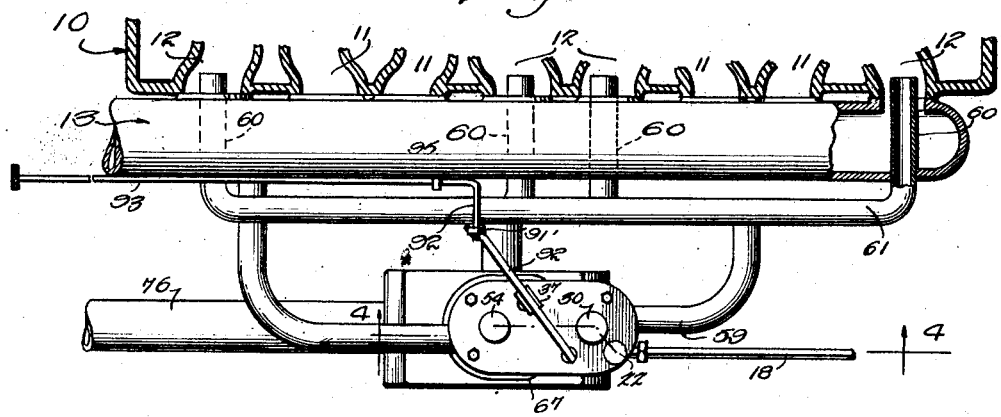

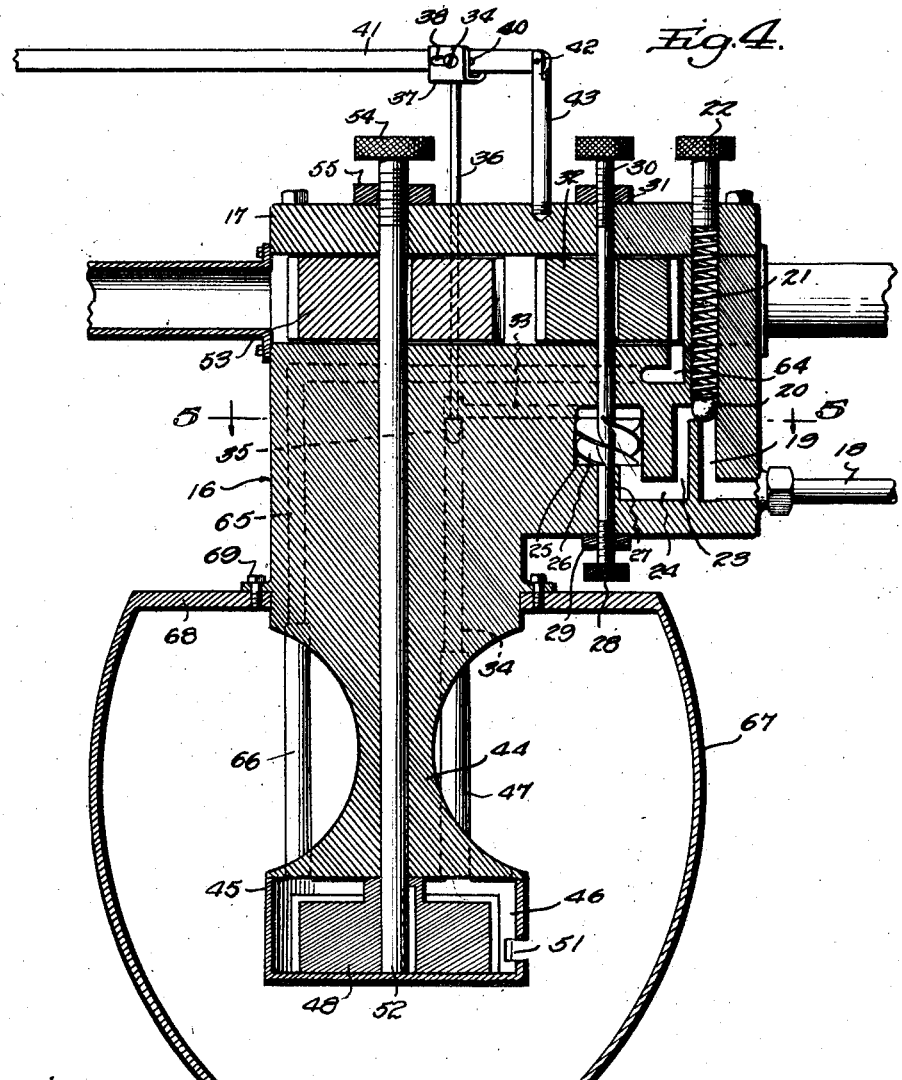
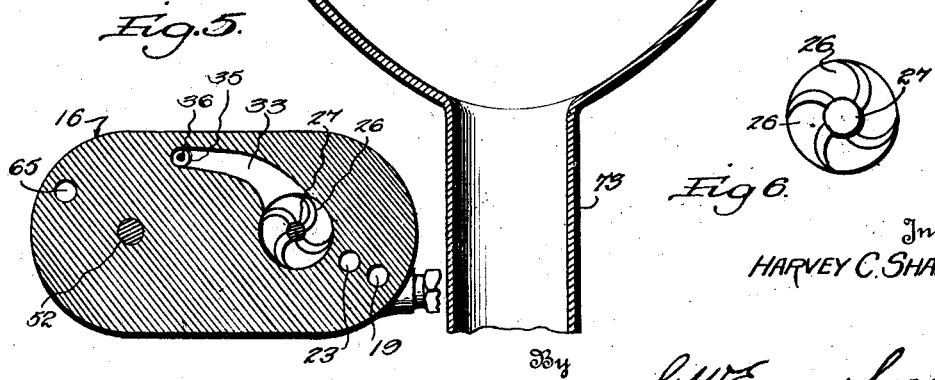

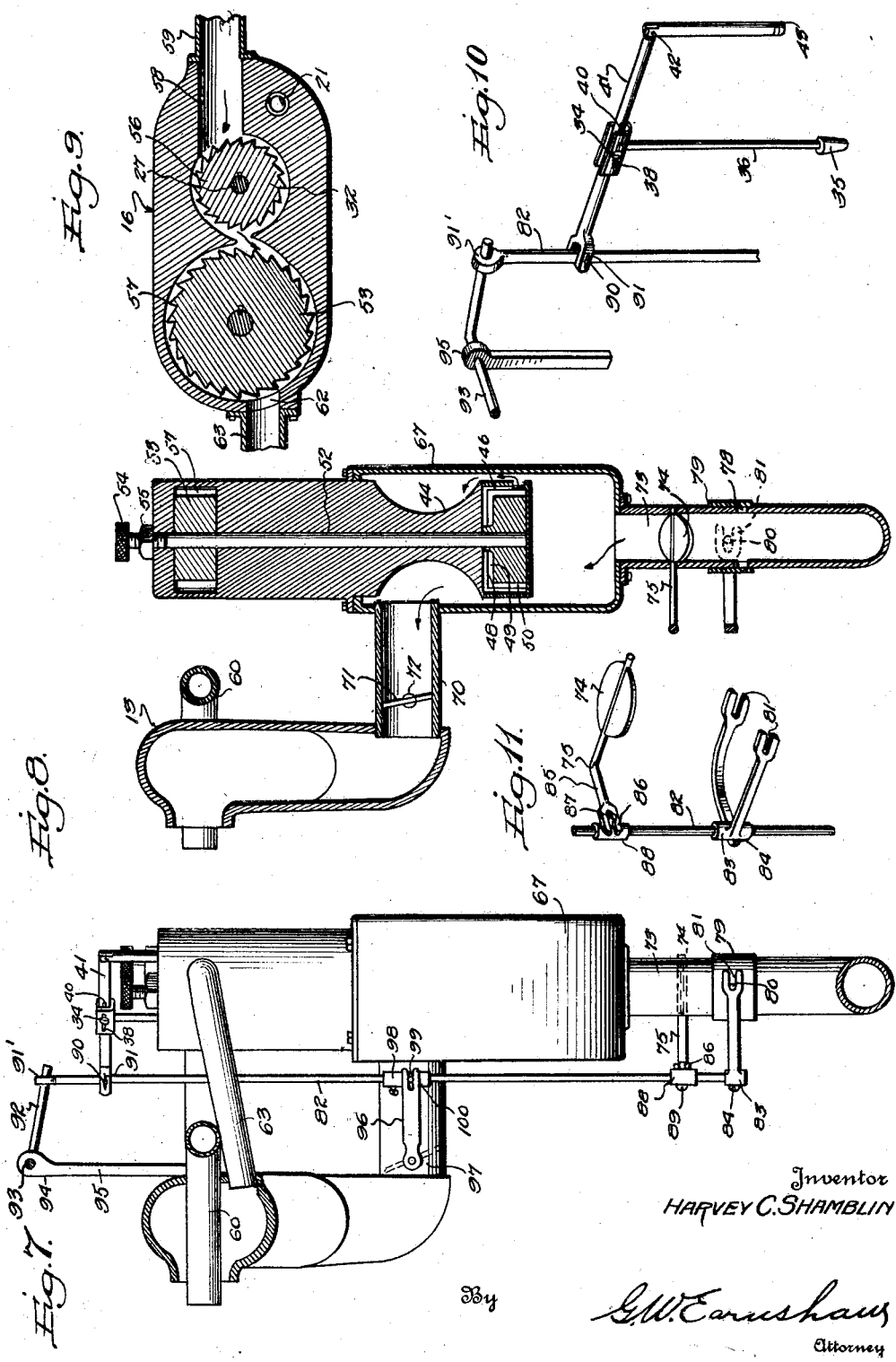

1,771,356

UNITED STATES PATENT OFFICE

HARVEY C. SHAMBLIN, OF MIAMI, OKLAHOMA

CHARGE-FORMING DEVICE FOR INTERNAL-COMBUSTION ENGINES

Application filed November 29, 1926. Serial No. 151,531.

This invention relates to charge forming devices for internal combustion engines.

An important object of the invention is to provide a device of the character referred to which is adapted to transform liquid fuel into a perfectly dry gas whereby efficient combustion is obtained.

A further object is to provide such a device wherein the supply of fuel is proportioned to varying engine speeds.

A further object is to provide a charge forming device wherein the supply of fuel to the chamber in which it is mixed with air to support combustion is accomplished by a mechanical pumping action.

A further object is to provide means for simultaneously varying the fuel and air supplied to the engine according to the position of the throttle.

A further object is to provide means for accomplishing the complete gasification of fuel of widely varying properties and to secure a thorough admixture of such gasified fuels with the proper proportion of air to support combustion.

A further object is to provide a substantially perfect fuel mixture immediately after the engine is started.

A further object is to provide means for simultaneously varying the fuel and air supplied to the engine, and to provide independently adjustable fuel and air regulating means whereby the proportions of fuel and air may be varied according to varying fuels and temperature conditions.

A further object is to utilize a small proportion of the inert exhaust gases for assisting in the gasification of the heavier constituents of the fuel.

A further object is to utilize the velocity of the explosive gases for pumping the fuel and for efficiently agitating the latter whereby it is adapted to form a dry highly volatile gas.

Other objects and advantages of the invention will become apparent during the course of the following description.

In the drawings I have shown one embodiment of the invention. In this showing,

Figure 1 is a plan view of the device showing it attached to an engine, parts being shown in section, Figure 2 is a side elevation, Figure 3 is a detail perspective of the fuel agitator, Figure 4 is a vertical section taken substantially on line 4—4 of Figure 1, Figure 5 is a section on line 5—5 of Figure 4, Figure 6 is a plan view of the fuel impeller, Figure 7 is a section on line 7—7 of Figure 2, Figure 8 is a similar view on line 8—8 of Figure 2, Figure 9 is a similar view on line 9—9 of Figure 2, Figure 10 is a detail perspective of portions of the operating mechanism, and, Figure 11 is a similar view of a portion of the air regulating means.

Referring to the drawings, the numeral 10 designates an internal combustion engine provided with intake and exhaust passages 11 and 12 respectively communicating with the cylinders of the engine. A combined intake and exhaust manifold 13 is arranged against the side of the engine, the intake passages of the manifold communicating with the passages 11 while the exhaust passages of the manifold communicate with the passages 12. The manifold is provided with a lower portion 14 into which the gas is initially admitted, and the exhaust gases are adapted to be discharged to the usual muffler through an exhaust pipe 15.

The charge forming device forming the subject matter of the present invention comprises a preferably cast block 16 having a cover plate 17 secured against its upper face. Liquid fuel is supplied to the charge forming device through a pipe 18 connected to a suitable source of supply and adapted to supply fuel to a vertically extending passage 19 provided at its upper end with a check valve 20. The spring 21 normally seats the valve 20, and the tension of the spring is adjustable by means of a screw 22. After passing the valve 20 in a manner to be described, the fuel passes downwardly through a passage 23 and thence through a passage 24 connected therewith to a pump chamber 25. An impeller 26 is arranged in the pump chamber as shown in Figure 4 and is adapted to be driven by a shaft 27. The impeller is provided with spiral blades whereby rotation of the impeller is adapted to draw liquid fuel into the pump chamber by unseating the valve 20. The lower end of the shaft 27 rests upon a screw 28 which is adapted to be secured in proper position by a lock nut 29. The upper end of the shaft similarly contacts with a vertically adjustable screw 30 provided with a lock nut 31. The shaft 27 obviously is provided with bearings formed in the block 16, and rotation of the shaft is accomplished by the rotation of a turbine wheel 32 keyed or otherwise secured to the shaft.

A horizontal passage 33 communicates at one end with the upper end of the pump chamber and at its opposite end with a downwardly extending passage 34, and the supply of fuel to the passage 34 is governed by a valve 35 carried by the lower end of a stem 36 which is slidable in a suitable opening provided in the block 16 and cover plate 17. The upper end of the stem 36 is provided with a substantially U-shaped head 37, the opposite arms of which are provided with slots 38 through which a small bolt 39 extends. This bolt is adapted to be secured in selected positions in the slot 38, for a purpose to be described, and extends through a slot 40 formed in an operating rod 41. The latter rod is pivotally connected as at 42 with an upstanding rod 43 which may be threaded into the plate 17, as shown in Figure 4.

The block 16 is provided with a depending portion 44 having a casing 45 secured to its lower end to provide an agitator chamber 46. A pipe 47 communicates at its upper end with the passage 34 and at its lower end with the mixing chamber. An agitator 48 is mounted within the chamber 46. The agitator, as shown in Figure 3, is provided in its upper and outer faces with grooves or slots 49 and 50 respectively, for a purpose to be described. It will be apparent that fuel from the pipe 47 will be discharged upon the upper face of the agitator, and fuel passes outwardly from the agitator chamber through an opening 51. A shaft 52 is keyed or otherwise secured to the agitator and is journaled in the depending portion 44 of the block 16. A turbine wheel 53 is secured to the shaft 52 to effect rotation of the agitator in a manner to be described. The shaft 52 is adapted to be adjustable by a screw 54 provided with a lock nut 55 engaging the upper face of the cover plate 17.

Means is provided for rotating the turbine wheels 32 and 53. As shown in Figure 9, the upper end of the block 16 is provided with communicating pockets 56 and 57 in which the wheels 32 and 53 are arranged, respectively. One side of the block is provided with an inlet passage 58 communicating with the pocket 56 substantially tangentially thereof and a pipe 59 communicates with the passage 58. The pipe 59 is adapted to be supplied with exhaust gases under pressure in the manner suggested in Figure 1. As shown, a pipe 60 extends into each of the exhaust passages 12 through the manifold 13, and each pipe 60 is connected to a small manifold 61 which in turn communicates with the pipe 59. The opposite side of the block 16 is provided with an outlet passage 62 which communicates through a pipe 63 with the exhaust manifold to return exhaust gases thereto.

The block 16 is provided with a substantially horizontal passage 64 one end of which communicates with the pocket 56 as shown in Figure 4. The opposite end of the passage 64 communicates with a vertical passage 65, and the lower end of the latter passage communicates with the interior of the casing 45 through a pipe 66. Thus it will be apparent that a small proportion of the exhaust gases will be supplied to the casing 45 as long as the engine is in operation.

As shown in Figure 4, a casing 67 surrounds the chamber 45 and communicates therewith through the opening 51. The top 68 of the casing is secured to the block 16 by screws or the like 69. The actual mixing of the fuel and air takes place within the casing 67, and the combustible mixture is supplied to the intake manifold through an intake pipe 70 as shown in Figure 8. The passage of combustible mixture through this pipe is controlled by a throttle valve 71 carried by a shaft 72.

The lower end of the casing 67 communicates with an air pipe 73 through which air is supplied to the casing 67. A suitable valve 74 is arranged in the pipe 73 to control the passage of air therethrough, and this valve is mounted upon a shaft 75. Referring to Figure 2, the pipe 73 is provided with an extension 76 which communicates at its end with a hot air stove 77 surrounding the exhaust pipe 15 whereby air passing into the end of the extension 76 will be heated. It has been found that advantageous results may be obtained by heating air prior to its mixture with fuel, but the air cannot be too highly heated without sacrificing power since the explosive mixture is too greatly expanded. Accordingly I provide means for admitting a small proportion of relatively cool air to prevent the temperature of the explosive mixture from being raised to too high a point. As shown in detail in Figure 8, the pipe 73 is provided with a plurality of openings 78 adapted to be governed by a sliding sleeve 79 surrounding the pipe 73. The sleeve 79 is provided with diametrically opposite trunnions 80 adapted to be engaged by forks 81 carried by a vertically extending shaft 82.

The connection between the forks 81 and shaft 82 is preferably through a collar 83, and this collar may be secured at selected points on the shaft 82 by means of a set screw 84. The shaft 75 is provided with a horizontal extension 85 carrying a fork 86 at its free end. This fork is adapted to receive a trunnion 87 carried by an adjusting collar 88 secured in desired positions on the rod 82 by a set screw 89. It will be apparent that vertical movement of the rod 82 is adapted to rock the valve 74 and to slide the sleeve 79, the latter acting as a valve to control the passage of relatively cool air into the pipe 73.

Adjacent its upper end, the rod 82 is provided with a transverse pin 90 which extends into slots 91 formed in the forked free ends of the operating member 41, as shown in Figure 7. The upper extremity of the rod 82 is provided with a relatively large eye 91' which receives a laterally extending arm 92 carried by a rock shaft 93. This rock shaft is journalled in bearings 94 formed in the upper ends of supports 95, the latter being secured at any desired points. The rock shaft 93 is connected in any suitable manner with the throttle lever or accelerator pedal of the vehicle, as will be apparent. The shaft 72 of the throttle valve is provided with an arm 96 secured thereto by a set screw or the like 97 as shown in Figure 7. A collar 98 is adjustable on the rod 82 and is provided with trunnions 99 engaging between the forks 100 provided at the free end of the arm 96.

The operation of the device is as follows:
A portion of the exhaust gases from the engine pass into the exhaust manifold through the passages 12 and are discharged into the muffler through the exhaust pipe 15 in the usual manner. Some of the exhaust gases pass under pressure into the pipes 60 and thence into the small manifold 61 from which they are discharged through the pipe 59 to the pocket 56. The pressure of the exhaust gases causes the rotation of the turbine wheel 32 and then the exhaust gases pass on into the pocket 57 to rotate the turbine wheel 53. The exhaust gases utilized in rotating the turbine wheel pass back into the exhaust manifold through the pipe 63. Rotation of the turbine wheel 32 obviously drives the impeller 26, thus creating a depression in the passages 23 and 24 to cause the check valve 20 to lift. Liquid fuel thus will be pumped through the passages 33 and 34 and will be discharged into the agitating chamber 46. The quantity of fuel supplied to the agitating chamber will be governed by the position of the valve 35, and the latter is regulated by movement of the operating member 41, as will be apparent. The fuel discharged into the chamber 46 strikes the upper face of the agitator wheel 48 and is thrown outwardly by centrifugal force by the upper grooves 49. The agitator wheel serves to greatly agitate the liquid fuel to gasify it and discharge it into the casing 67 through the opening 51. Simultaneously with this action, a small proportion of the exhaust gases will flow into the agitator chamber through passages 64 and 65, and pipe 66. It will be apparent that the block 16 will be maintained at a fairly high temperature, and this temperature is sufficient to vaporize or gasify the lighter constituents of the fuel. The fuel, upon being mixed with a small percentage of exhaust gases within the chamber 46 is further broken down, the exhaust gases serving to assist in the gasification of the heavier fuel constituents. Thus it will be apparent that a dry gas will be discharged through the opening 55, and due to the gasification of the fuel, the gas will pass out of the opening 51 at a fairly high velocity thus causing an agitating action within the casing 67 whereby the incoming air is thoroughly mixed with the gas to form a highly combustible mixture. This mixture passes into the intake manifold through the pipe 70, as shown in Figure 8.

Some of the air supplied to the casing 67 will be relatively highly heated by passing through the stove 77, and the temperature of this air is maintained at the proper point by the admission of relatively cool air into the pipe 73 through openings 78. As previously stated, the upper end of the rod 82 is connected to the operating member 41, and accordingly these elements are simultaneously operable. When the valve 35, which controls the passage of fuel into the agitating chamber, is opened, the valves 74 and 79 will be opened to a substantially corresponding extent. As also previously stated, the rod 82 is adapted to be actuated by the rocking of the shaft 93, the latter action being controlled by the driver of the vehicle through the medium of the throttle lever or accelerator pedal. It will be apparent that the movement of the rod 82 is transmitted to the throttle valve through the arm 96. If, in the operation of the device, it is found that the explosive mixture is being too greatly expanded due to its temperature, the screw 84 may be loosened and the forks 81 moved upwardly, whereby the admission of relatively cool air to the pipe 73 is increased. The admission of air into the casing 67 may be controlled by changing the position of the collar 88 on the rod 82. If it is found that an incorrect proportion of liquid fuel is being supplied to the agitating chamber, the bolt 39 may be moved to different positions along the slots 38, thus changing the effective lever lengths of the operating member 41 to vary the opening movement of the valve 35. In practice, the impeller 26 is preferably arranged below the level of the fuel in the source whereby very little pumping action is necessary to lift the valve 20 and to positively supply fuel under pressure to the agitating chamber. It will be obvious that the tension of the spring 21 may be varied according to operating conditions. The adjusting screws 28, 30 and 54 are provided merely to take up play as the moving parts with which they are associated become worn.

From the foregoing it will be seen that operation of the throttle lever or accelerator pedal is adapted to transmit motion to the throttle valve, and such motion also is transmitted to the two air control valves and to the fuel feeding valve, whereby the admission of air and fuel, and the proportion of heated and relatively cool air may be varied according to engine speeds and other operating conditions. The provision of the movable fuel control valve 35 permits exactly the right proportion of fuel to be supplied for any given engine speed, thus preventing too rich or too lean a mixture from being formed. The addition of the hot inert gas to the agitating chamber through the pipe 66 serves to effectually gasify the heavier fuel constituents. The resulting explosive mixture is extremely dry and is supplied to the engine at the correct temperature and in correct quantities, the constituents of the mixture being thoroughly commingled whereby an extremely efficient explosive mixture is provided for all engine speeds. The provision of the means for supplying the hot inert gas to the agitating chamber also serves to provide a more efficient mixture before the engine has had time to become thoroughly warmed than is usually the case, since ordinarily the proper gasification of the fuel is dependent upon the heat of the exhaust manifold itself.

It is to be understood that the form of the invention herewith shown and described is to be taken as a preferred example of the same, and that various changes in the shape, size and arrangement of parts may be resorted to without departing from the spirit of the invention or the scope of the subjoined claims.

I claim:—

1. In a charge forming device for internal combustion engines, a relatively large mixing chamber having an opening for the admission of air, an agitating chamber arranged in said mixing chamber and communicating therewith, means for delivering a portion of the exhaust gases from the engine to the agitating chamber, a conduit communicating at one end with said agitating chamber and adapted to supply fuel thereto, a valve controlling said conduit, an impeller arranged in said conduit and adapted to force fuel therethrough, a turbine wheel connected to said impeller, a rotatable agitator arranged in said agitating chamber, a turbine connected to said agitator, and means for conveying exhaust gases from the engine past said turbines to effect rotation thereof.

2. A device constructed in accordance with claim 1 wherein said agitator comprises a substantially cylindrical member provided in one face adjacent the end of said conduit with a plurality of radial grooves, said agitator being further provided in its curved face with a plurality of grooves each communicating with one of said radial grooves.

3. In a charge forming device for internal combustion engines, a relatively large mixing chamber having an opening for the admission of air, an agitating chamber arranged in said mixing chamber and communicating therewith, a conduit communicating at one end with said agitating chamber and adapted to supply fuel thereto, a valve controlling said conduit, an impeller arranged in said conduit and adapted to force fuel therethrough, a turbine wheel connected to said impeller, a rotatable agitator arranged in said agitating chamber, a turbine connected to said agitator, means for conveying exhaust gases from the engine past said turbines to effect rotation thereof, and means for delivering a portion of the exhaust gases from the engine to said agitating chamber.

4. A device constructed in accordance with claim 3 wherein means for conveying exhaust gases past said turbines includes a pipe having one end adapted to be arranged in the exhaust passage of an engine cylinder.

5. In a charge forming device for internal combustion engines, a mixing chamber, an air pipe communicating with said mixing chamber, a valve controlling the passage of air through said pipe, a conduit adapted to supply fuel to said mixing chamber, a fuel valve adapted to control passage of fuel through said conduit, means for supplying fuel to said conduit, an outlet passage communicating at one end with said mixing chamber and adapted to communicate at its other end with the intake manifold of an internal combustion engine, a throttle mounted in said outlet passage, means for supplying heated air to said air pipe, and second air valve arranged between said first named air valve and said heating means for supplying unheated air to said air pipe, an actuating member for said throttle, and connections between said actuating member and said air valves and said fuel valve whereby said actuating member will simultaneously operate said throttle, said fuel valve and said air valves.

6. In a charge forming device for internal combustion engines, a mixing chamber, an air pipe communicating with said mixing chamber, a valve controlling the passage of air through said pipe, a conduit adapted to supply fuel to said mixing chamber, a fuel valve adapted to control the passage of fuel through said conduit, means for supplying fuel to said conduit, an outlet passage communicating at one end with said mixing chamber and adapted to communicate at its opposite end with the intake manifold of an internal combustion engine, a throttle mounted in said outlet passage, means for supplying heated air to said air pipe, a second air valve arranged between said first named air valve and said heating means for supplying unheated air to said air pipe, an actuating member for said throttle, connections between said actuating member and said throttle, connections between said actuating member and said fuel valve, connections between said actuating member and each of said air valves, and means for individually adjusting said connections whereby said actuating member will simultaneously operate said throttle, said fuel valve and said air valves.

7. In a charge forming device for internal combustion engines, a relatively large mixing chamber, a block having a depending portion arranged in said mixing chamber, an agitating chamber carried by the lower end of the depending portion of said block and provided in one wall thereof with an opening communicating with said mixing chamber, an agitator arranged in said agitating chamber, means for delivering a portion of the exhaust gases from the engine to the agitating chamber, a conduit having portions formed in said block and communicating at one end with said agitating chamber, an impeller adapted to supply fuel to said conduit, a fuel valve adapted to control passage of fuel through said conduit, said block being provided with a pair of communicating pockets, a turbine arranged in one pocket and connected to said impeller, a second turbine arranged in the other pocket and connected to said agitator, means for passing exhaust gases from the engine through said pockets to effect rotation of said turbines, an air pipe communicating with said mixing chamber, an outlet pipe connected at one end to said mixing chamber and adapted to communicate at its opposite end with the intake manifold of the engine, and a throttle arranged in said outlet pipe.

8. A device constructed in accordance with claim 7 provided with means for heating air passing into the end of said air pipe, an air valve arranged in said pipe adjacent said mixing chamber and controlling the passage of air thereinto, a second air valve associated with said pipe and adapted to control the passage of unheated air thereinto, a throttle actuating member, means adjustably connecting said actuating member to said throttle, means for adjustably connecting said actuating member to said air valves, a lever pivotally supported at one end and connected at its opposite end to said actuating member, and means for adjustably connecting said fuel valve to said lever.

9. In a charge forming device for internal combustion engines, a relatively large mixing chamber, a block having a depending portion arranged in said mixing chamber, an agitating chamber carried by the lower end of the depending portion of said block, and provided in one wall thereof with an opening communicating with said mixing chamber, an agitator arranged in said agitating chamber, a conduit having portions forming in said block, and communicating at one end with said agitating chamber, an impeller adapted to supply fuel to said conduit, a fuel valve adapted to control passage of fuel through said conduit, said block being provided with a pair of communicating pockets, a turbine arranged in one pocket and connected to said impeller, a second turbine arranged in the other pocket and connected to said agitator, means for passing exhaust gases from the engine through said pockets to effect rotation of said turbines, an air pipe communicating with said mixing chamber, an outlet pipe connected at one end to said mixing chamber, and adapted to communicate at its opposite end with the intake manifold of the engine, a throttle arranged in said outlet pipe, and a conduit communicating at one end with one of said pockets, and at its opposite end with said agitating chamber.

In testimony whereof I affix my signature.

HARVEY C. SHAMBLIN.